(12) United States Patent
Yawata et al.

(10) Patent No.: US 9,613,650 B2
(45) Date of Patent: Apr. 4, 2017

(54) SPINDLE MOTOR, DISK DRIVE APPARATUS, AND METHOD OF MANUFACTURING BASE UNIT OF SPINDLE MOTOR

(71) Applicant: Nidec Corporation, Kyoto (JP)

(72) Inventors: Atsushi Yawata, Kyoto (JP); Shigeki Horiki, Kyoto (JP); Ryohei Matsumoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 14/863,764

(22) Filed: Sep. 24, 2015

(65) Prior Publication Data

US 2016/0163349 A1 Jun. 9, 2016

(30) Foreign Application Priority Data

Dec. 9, 2014 (JP) .................................. 2014-248546

(51) Int. Cl.
| | | |
|---|---|---|
| *G11B 19/20* | (2006.01) | |
| *B23K 26/00* | (2014.01) | |
| *B23K 26/03* | (2006.01) | |
| *B23K 26/351* | (2014.01) | |
| *H02K 15/03* | (2006.01) | |

(Continued)

(52) U.S. Cl.
CPC ...... *G11B 19/2009* (2013.01); *B23K 26/0093* (2013.01); *B23K 26/03* (2013.01); *B23K 26/351* (2015.10); *B23K 26/352* (2015.10); *H02K 15/03* (2013.01); *B23K 2201/34* (2013.01); *B23K 2201/36* (2013.01); *B23K 2203/04* (2013.01); *B23K 2203/10* (2013.01)

(58) Field of Classification Search
None
See application file for complete search history.

(56) References Cited

U.S. PATENT DOCUMENTS

2007/0271769 A1   11/2007   Kagata et al.

FOREIGN PATENT DOCUMENTS

| JP | 2007317272 A | * | 12/2007 |
|---|---|---|---|
| JP | 2008152858 A | * | 7/2008 |

(Continued)

OTHER PUBLICATIONS

English-machine translation of JP2008-152858A to Okayama et al., published on Jul. 3, 2008.*

(Continued)

*Primary Examiner* — Will J Klimowicz
(74) *Attorney, Agent, or Firm* — Keating & Bennett, LLP

(57) ABSTRACT

A method of manufacturing a base unit of a spindle motor includes the steps of: defining a base plate including a support fitting portion; fitting a support to a hole portion passing through the support fitting portion; measuring an inclination of the support fitting portion; calculating a laser irradiation area and a laser irradiation output based on the inclination; irradiating the support fitting portion with a laser beam; and measuring the inclination of the support fitting portion again. The base plate is made of a metal, and is defined by press working, casting, or forging. The support is fitted to the hole portion by crimping, press fitting, or welding. This method reduces the inclination of the support fitting portion, thereby reducing a distortion of the support, which serves as a rotation center of an access portion.

7 Claims, 7 Drawing Sheets

LASER IRRADIATION

(51) Int. Cl.
*B23K 26/352* (2014.01)
*B23K 101/34* (2006.01)
*B23K 101/36* (2006.01)
*B23K 103/04* (2006.01)
*B23K 103/10* (2006.01)

(56) References Cited

FOREIGN PATENT DOCUMENTS

| JP | 2009-159701 A | | 7/2009 |
|---|---|---|---|
| JP | 2010193579 A | * | 9/2010 |

OTHER PUBLICATIONS

English-machine translation of JP2010-193579A to Hamada, published on Sep. 2, 2010.*

* cited by examiner

US 9,613,650 B2

SPINDLE MOTOR, DISK DRIVE APPARATUS, AND METHOD OF MANUFACTURING BASE UNIT OF SPINDLE MOTOR

BACKGROUND OF THE INVENTION

1. Field of the Invention

The present invention relates to a spindle motor, a disk drive apparatus, and a method of manufacturing a base unit of the spindle motor.

2. Description of the Related Art

A disk drive apparatus, such as, for example, a hard disk apparatus or an optical disk apparatus, typically includes a spindle motor arranged to rotate a disk about a rotation axis thereof, and an access portion including a head portion arranged to read or write data from or to the disk. A disk drive apparatus including a spindle motor and a head portion is described in, for example, JP-A 2009-159701.

In the disk drive apparatus described in JP-A 2009-159701, an access portion includes head portions and arms (i.e., carriage portions). Each carriage portion is rotatably supported by a columnar rotation shaft, and the head portion is attached to a tip of each carriage portion (see paragraph [0036] and FIGS. 1 and 2 of JP-A 2009-159701).

In this disk drive apparatus, the rotation shaft of the arms of the access portion is arranged to be perpendicular to disks. Meanwhile, the head portions are attached to the tips of the arms. Therefore, if the rotation shaft of the arms is bent, a distance between each head portion and a corresponding one of the disks may become inappropriate for data writing or reading.

SUMMARY OF THE INVENTION

According to a preferred embodiment of the present invention, there is provided a method of manufacturing a base unit to which an armature of a spindle motor is fixed, the method including the steps of a) defining a base plate made of a metal and including a plate-shaped support fitting portion and a hole portion passing through the support fitting portion by press working, casting, or forging; b) after step a), fitting a substantially columnar support extending along a central axis to the hole portion by crimping, press fitting, or welding; c) after step b), measuring an inclination of a plane of the support fitting portion with respect to a reference surface of the base plate; d) after step c), calculating a laser irradiation area and a laser irradiation output based on the inclination; e) after step d), irradiating the support fitting portion with a laser beam based on the laser irradiation area and the laser irradiation output; and f) after step e), measuring the inclination of the plane of the support fitting portion with respect to the reference surface of the base plate.

According to another preferred embodiment of the present invention, there is provided a spindle motor including a stationary portion including an armature and a base plate to which the armature is fixed; and a rotating portion including a magnet, and arranged to rotate about a rotation axis with respect to the stationary portion. The base plate is defined by press working, casting, or forging. The base plate includes a flat reference surface; a plate-shaped support fitting portion arranged to extend parallel or substantially parallel to the reference surface; and a hole portion arranged to pass through the support fitting portion. A substantially columnar support extending along a central axis is fitted to the hole portion by crimping, press fitting, or welding. The support fitting portion includes a melting mark defined at at least a portion of an area surrounding the support.

According to preferred embodiments of the present invention, a distortion of the support can be reduced. Accordingly, a distortion of a central axis which is a rotation center of an access portion can be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a rotation axis of a spindle motor is referred to by the term "axial direction", "axial", or "axially", that directions perpendicular to the rotation axis of the spindle motor are each referred to by the term "radial direction", "radial", or "radially", and that a direction along a circular arc centered on the rotation axis of the spindle motor is referred to by the term "circumferential direction", "circumferential", or "circumferentially". It is also assumed herein that an axial direction is a vertical direction, and that a side on which a stator is arranged with respect to a base portion is an upper side, and the shape of each member or portion and relative positions of different members or portions will be described based on the above assumptions. It should be noted, however, that the above definitions of the vertical direction and the upper and lower sides are not meant to restrict in any way the orientation of a spindle motor or a disk drive apparatus according to any preferred embodiment of the present invention when in use.

Figure 1:
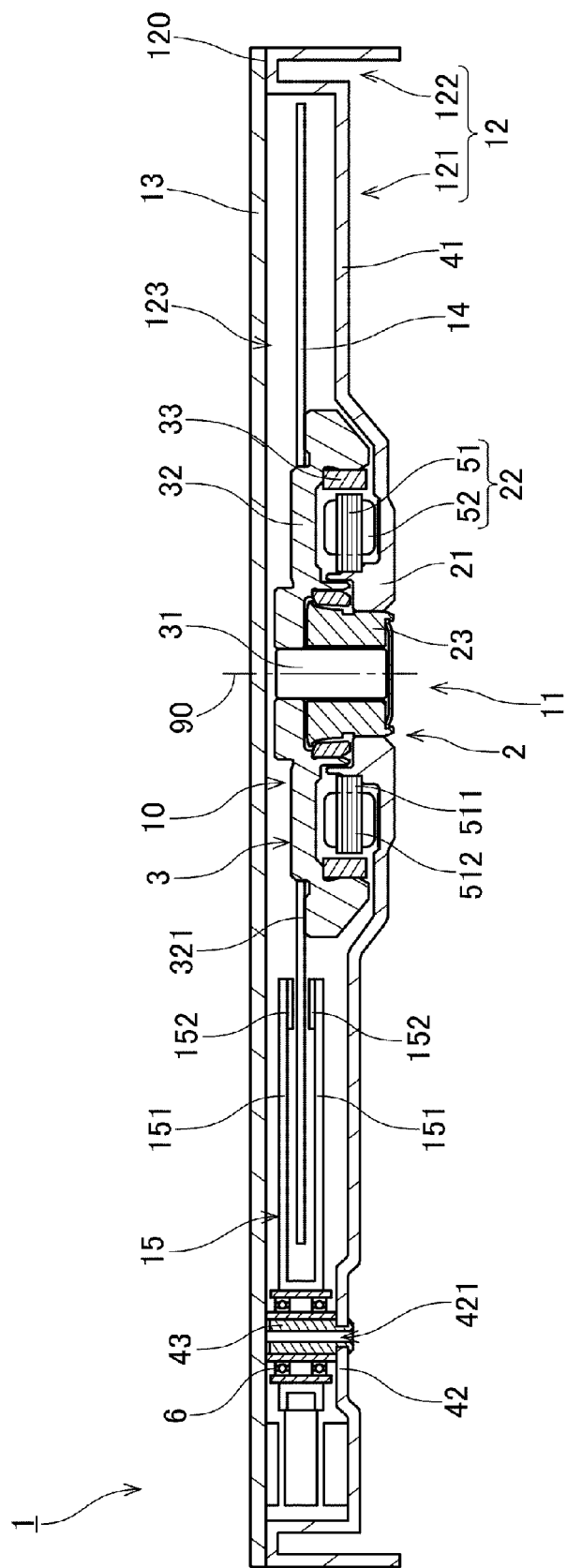
FIG. 1 is a vertical cross-sectional view of a disk drive apparatus according to a preferred embodiment of the present invention.
Figure 2:
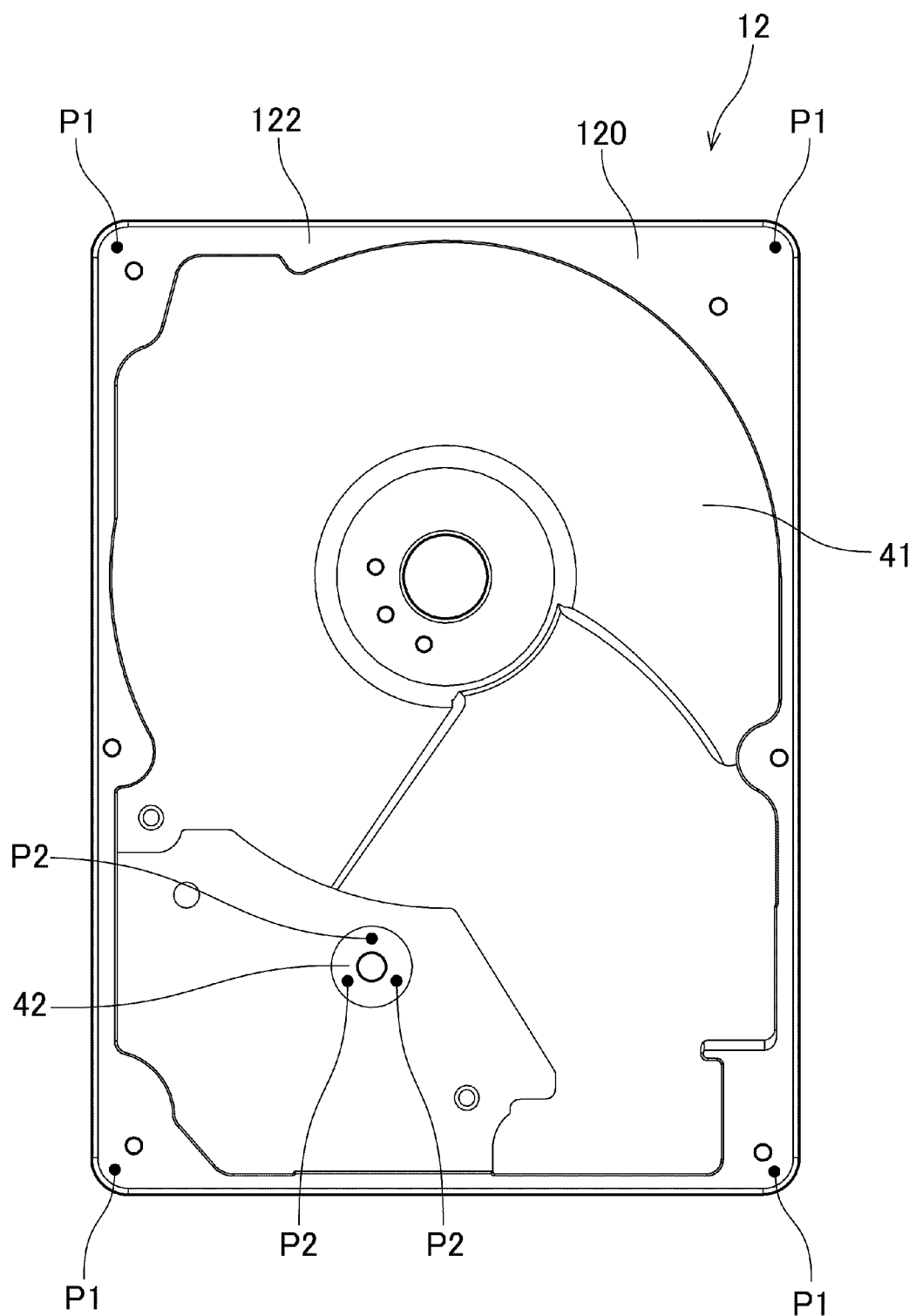
FIG. 2 is a top view of a base plate according to a preferred embodiment of the present invention.
Figure 3:
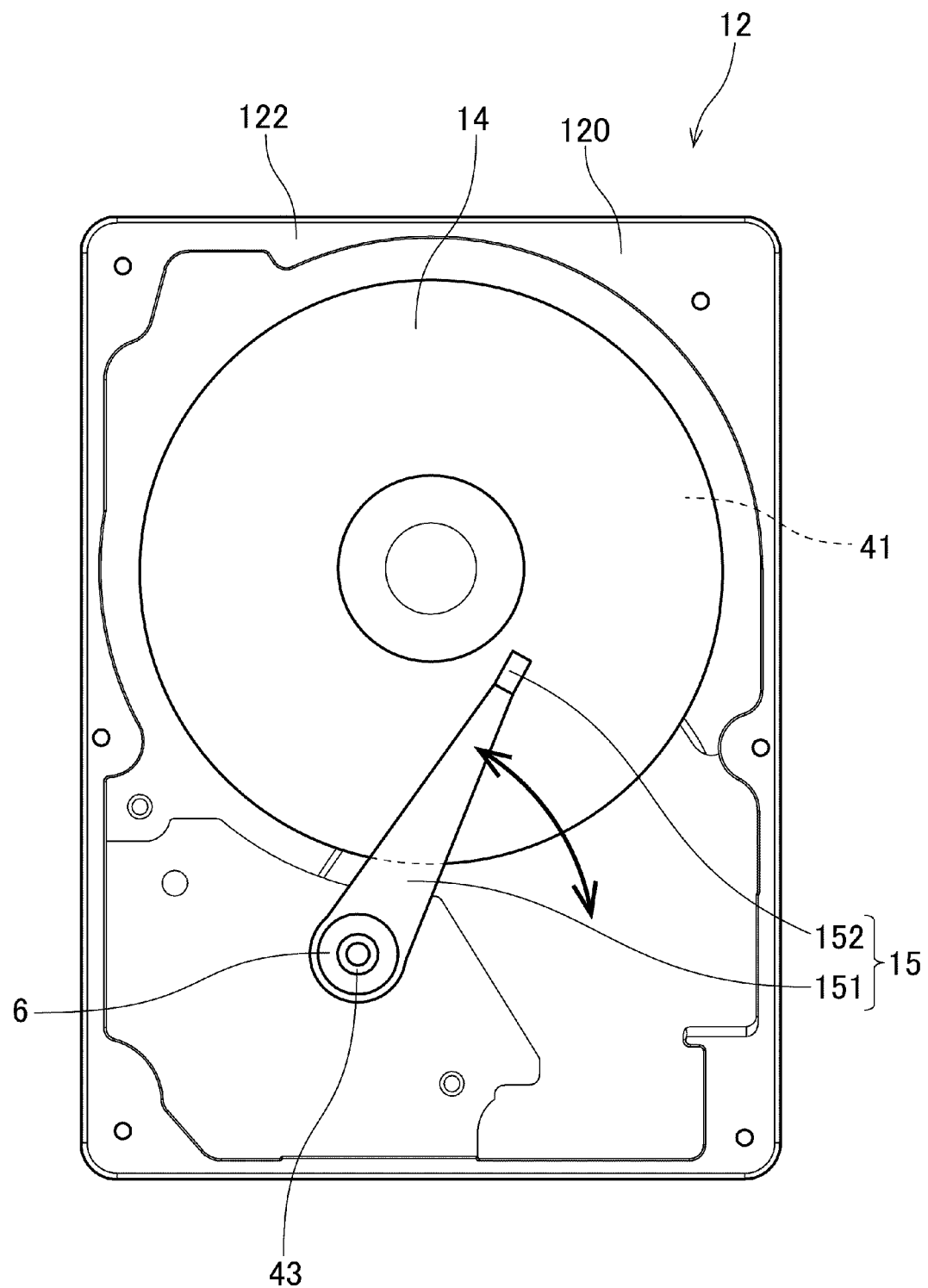
FIG. 3 is a top view of the disk drive apparatus according to a preferred embodiment of the present invention with a cover removed therefrom.

FIG. 1 is a vertical cross-sectional view of a disk drive apparatus 1 according to a first preferred embodiment of the present invention. FIG. 2 is a top view of a base plate 12. FIG. 3 is a top view of the disk drive apparatus 1 with a cover 13 removed therefrom.

The disk drive apparatus 1 is an apparatus arranged to rotate a magnetic disk 14 (hereinafter referred to simply as the "disk 14") and perform reading and writing of information from or to the disk 14. Referring to FIG. 1, the disk drive apparatus 1 includes a spindle motor 11, the base plate 12, the cover 13, the disk 14, and an access portion 15.

The spindle motor 11 is arranged to rotate the disk 14 about a rotation axis 90 while supporting the disk 14. The spindle motor 11 includes a stationary portion 2 including a base portion 21, and a rotating portion 3. The base portion 21 is a portion of the base plate 12, and is defined integrally with a remaining portion of the base plate 12.

The base plate 12 includes a bottom portion 121 and a wall portion 122. The bottom portion 121 is arranged to extend perpendicularly to the rotation axis 90. The bottom portion 121 includes the base portion 21, a disk arranging portion 41, and a support fitting portion 42. As suggested above, the base portion is a portion of the spindle motor 11. The disk arranging portion 41 is arranged to extend radially outward from the base portion 21. Referring to FIGS. 1 and 3, once the disk 14 is installed in the disk drive apparatus 1, the disk 14 is arranged over the disk arranging portion 41. The support fitting portion is a substantially disk-shaped portion arranged radially outward of the disk arranging portion 41. Arms 151, which will be described below, of the access portion 15 are fitted to the support fitting portion 42.

The wall portion 122 is arranged radially outward of the disk 14 and the access portion 15, and is arranged to extend upward from an outer circumferential portion of the bottom portion 121. In addition, the wall portion 122 is arranged to surround the bottom portion 121. Referring to FIG. 1, the base plate 12 has an opening 123 on an upper side thereof. An upper end surface of the wall portion 122 is flat and is arranged to extend perpendicularly to the rotation axis 90. The upper end surface of the wall portion 122 defines a reference surface 120 which serves as a reference for the height of a base unit 10 made up of the spindle motor 11, the base plate 12, and the access portion 15.

The base plate 12 according to the present preferred embodiment is produced by subjecting rolled steel to press working to define a base material and coating a surface of the base material with electroless nickel plating. Note that the base plate 12 may alternatively be produced by, for example, defining a base material made of aluminum by casting or forging and coating a surface of the base material with a resin coating. Further, the base plate 12 may alternatively be made of another metallic material, and may alternatively be produced by another method.

The cover 13 is arranged to cover the opening 123 of the base plate 12. In other words, the cover 13 is arranged to close an upper side of the base plate 12. The base plate 12 and the cover 13 are arranged to together define a case. The rotating portion 3 of the spindle motor 11, the disk 14, and the access portion 15 are accommodated inside the case.

The disk 14 is supported by the rotating portion 3 of the spindle motor 11. Once the spindle motor 11 is driven, the disk 14 is caused to rotate together with the rotating portion 3.

The access portion 15 includes the arms 151 and head portions 152. The arms 151 are arranged to rotate about a support 43 fitted to the support fitting portion 42 to move the head portions 152 along recording surfaces of the disk 14. Each head portion 152 is arranged to perform reading and writing of information from or to the disk 14. Note that each head portion 152 may alternatively be arranged to perform only one of the reading and the writing of information from or to the disk 14. Fitting of the access portion 15 to the base plate 12 will be described below.

Note that the disk drive apparatus 1 may alternatively be arranged to include two or more disks 14.

Next, the structure of the spindle motor 11 described above will now be described below. Referring to FIG. 1, the spindle motor 11 includes the stationary portion 2, which is stationary relative to the base plate 12 of the disk drive apparatus 1, and the rotating portion 3, which is arranged to rotate about the rotation axis 90 while supporting the disk 14.

The stationary portion 2 according to the present preferred embodiment includes the base portion 21, a stator 22, and a bearing unit 23.

The base portion 21 is arranged to extend perpendicularly to the rotation axis 90 below the rotating portion 3, the disk 14, and the access portion 15. In addition, as suggested above, the base portion 21 is a portion of the bottom portion 121 of the base plate 12.

The stator 22 includes a stator core 51 and a plurality of coils 52. The stator core 51 and the coils 52 are arranged above the base portion 21. The stator core 51 includes an annular core back 511 and a plurality of teeth 512. An inner circumferential surface of the core back 511 is fixed to the base portion 21. The stator 22 is thus fixed to the base plate 12. The teeth 512 are arranged to project radially outward from the core back 511. Each coil 52 is defined by a conducting wire wound around a separate one of the teeth 512.

The bearing unit 23 is arranged to accommodate a lower end portion and its vicinity of a shaft 31, which will be described below, and cover a lower end surface of the shaft 31. That is, the bearing unit 23 has a bottom and is cylindrical. In addition, the bearing unit 23 is arranged radially inside of the base portion 21, and is fixed to the base portion 21. Note that the bearing unit 23 may be defined either by a plurality of members as illustrated in FIG. 1 or by a single monolithic member.

The rotating portion 3 includes the shaft 31, a hub 32, and a magnet 33.

The shaft 31 is a columnar member arranged to extend in an axial direction. A metal, such as stainless steel, for example, is used as a material of the shaft 31. As mentioned above, the lower end portion of the shaft 31 is accommodated inside the bearing unit 23.

The hub 32 is arranged to extend radially outward from a peripheral portion of an upper end portion of the shaft 31. The hub 32 includes a disk mount portion 321 at an outer edge portion thereof. In addition, as illustrated in FIG. 1, the disk 14 is mounted on the disk mount portion 321, and is fixed to the hub 32 through a clamper (not shown).

A lubricating fluid is arranged between the bearing unit 23 and a combination of the shaft 31 and the hub 32. A lubricating oil, for example, is used as the lubricating fluid. The shaft 31 is supported to be rotatable with respect to the bearing unit 23 through the lubricating fluid. The rotating portion 3 is thus arranged to rotate about the rotation axis 90.

The magnet 33 is arranged radially outside of the stator 22, and is fixed to the hub 32.

Once electric drive currents are supplied to the coils 52 in the spindle motor 11 as described above, magnetic flux is generated around each of the teeth 512. Then, interaction between the magnetic flux of the teeth 512 and that of the magnet 33 produces a circumferential torque, so that the rotating portion 3 is caused to rotate about the rotation axis 90 with respect to the stationary portion 2. In addition, the disk 14 supported by the hub 32 is caused to rotate about the rotation axis 90 together with the rotating portion 3.

Figure 4:
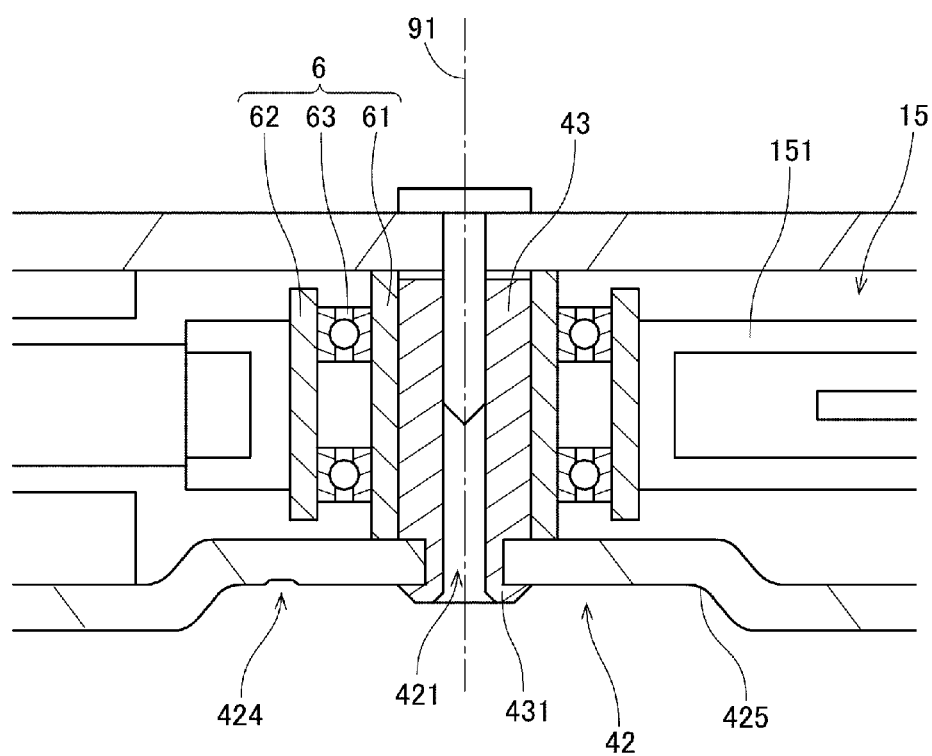
FIG. 4 is a partial vertical cross-sectional view of the disk drive apparatus according to a preferred embodiment of the present invention.

Next, a structure which fits the access portion 15 to the base plate 12 will now be described below with reference to FIG. 4. FIG. 4 is a partial cross-sectional view of the disk drive apparatus 1.

The support fitting portion 42 of the base plate 12 is a plate-shaped portion arranged to extend parallel or substantially parallel to the reference surface 120. A hole portion 421 passing through the support fitting portion 42 in the vertical direction is defined in a substantial center of the support fitting portion 42. The support 43 is fitted to the hole portion 421.

The support 43 is a substantially columnar member fitted to the support fitting portion 42 above an upper surface of the support fitting portion 42. The support 43 is arranged to extend in the axial direction along a central axis 91, which is a rotation center of the access portion 15. That is, the access portion 15 is arranged to rotate about the support 43. In addition, a through hole extending in the vertical direction is defined in a center of the support 43.

The support 43 is fitted to the hole portion 421 by crimping. Specifically, a lower end portion of the support 43 is plastically deformed to make contact with a lower surface of the support fitting portion 42. As a result, a crimping portion 431 arranged to extend along the lower surface of the support fitting portion 42 is defined in the lower end portion of the support 43 as illustrated in FIG. 4. Note that the support 43 may alternatively be fitted to the hole portion 421 through press fitting or welding. On the other hand, an upper end portion of the support 43 is fixed to the cover 13 by, for example, screwing.

A pivot assembly 6 is fitted to an outer circumferential surface of the support 43. The pivot assembly 6 includes an inner cylindrical portion 61, an outer cylindrical portion 62, and bearing portions 63. Each of the inner cylindrical portion 61 and the outer cylindrical portion 62 is a substantially cylindrical member. An inner circumferential surface of the inner cylindrical portion 61 is fixed to the outer circumferential surface of the support 43. An inner circumferential surface of the outer cylindrical portion 62 is rotatably fitted to an outer circumferential surface of the inner cylindrical portion 61 through the bearing portions 63. In addition, the arms 151 of the access portion 15 are fixed to an outer circumferential surface of the outer cylindrical portion 62.

The bearing portions 63 are arranged to support the access portion 15 through the outer cylindrical portion 62 such that the access portion 15 is rotatable. Ball bearings arranged to rotate outer and inner races relative to each other through balls are used as the bearing portions 63 according to the present preferred embodiment. Note, however, that another type of bearing, such as, for example, a plain bearing or a fluid bearing, may be used instead of the ball bearings.

As described above, the access portion 15 is rotatably fitted to the support 43 through the pivot assembly 6. Accordingly, if a direction in which the support 43 extends is bent with respect to the spindle motor 11, the central axis 91, which is the rotation center of the access portion 15, is bent with respect to the rotation axis 90 of the spindle motor 11. This may change relative positions of the disk 14 supported by the spindle motor 11 and the head portions 152 of the access portion 15. In particular, according to the present preferred embodiment, a length of each arm 15 is much greater than a length of the support 43. Therefore, an inclination of the support 43 will displace each head portion 152 to a great extent. It is therefore necessary to improve parallelism of the support fitting portion 42 with the reference surface 120 in a process of manufacturing the base unit 10.

Figure 5:
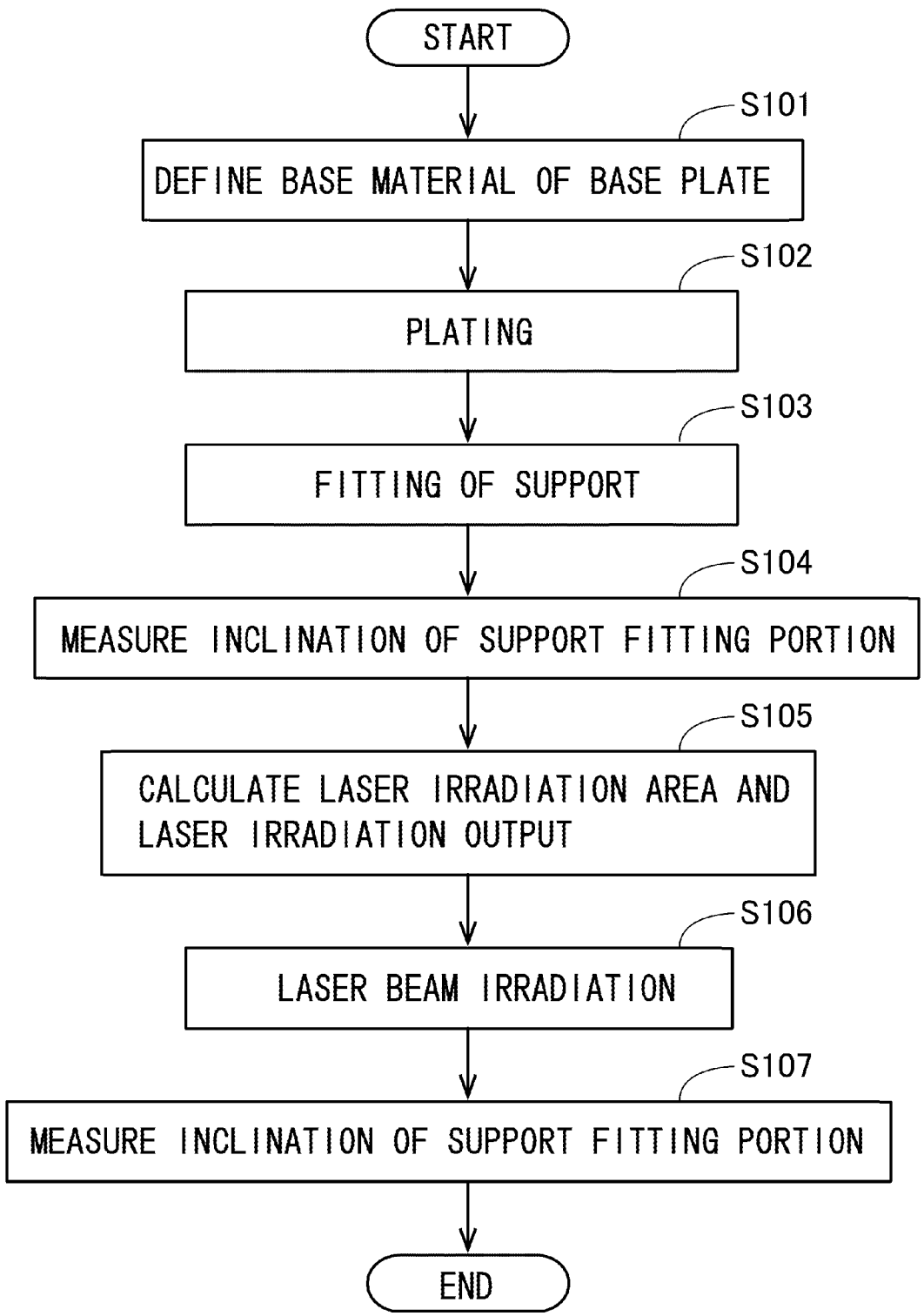
FIG. 5 is a flowchart illustrating a procedure of a portion of a process of manufacturing a base unit according to a preferred embodiment of the present invention.
Figure 6:
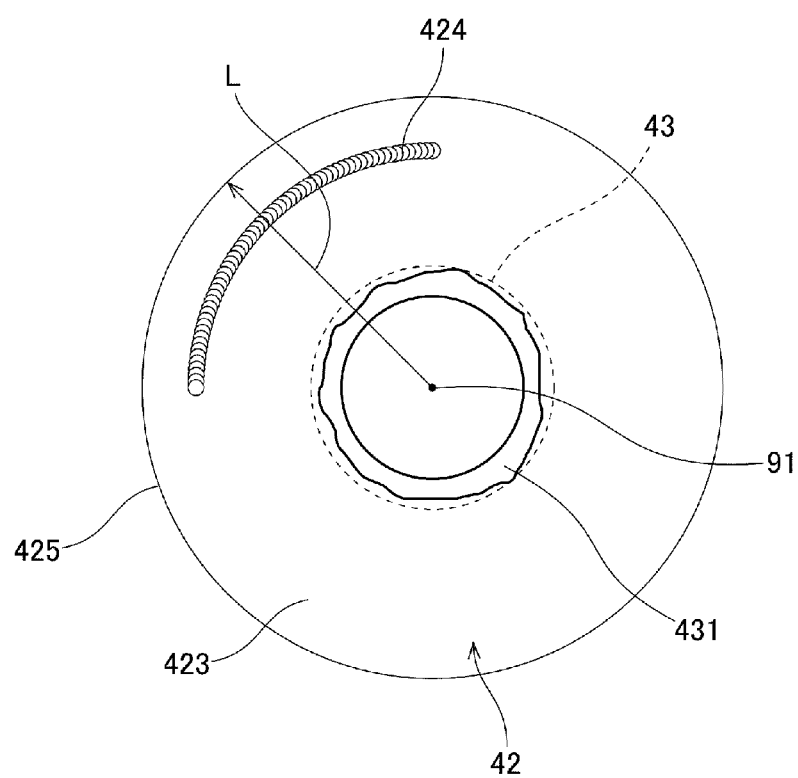
FIG. 6 is a partial bottom view of the base plate according to a preferred embodiment of the present invention.
Figure 7:
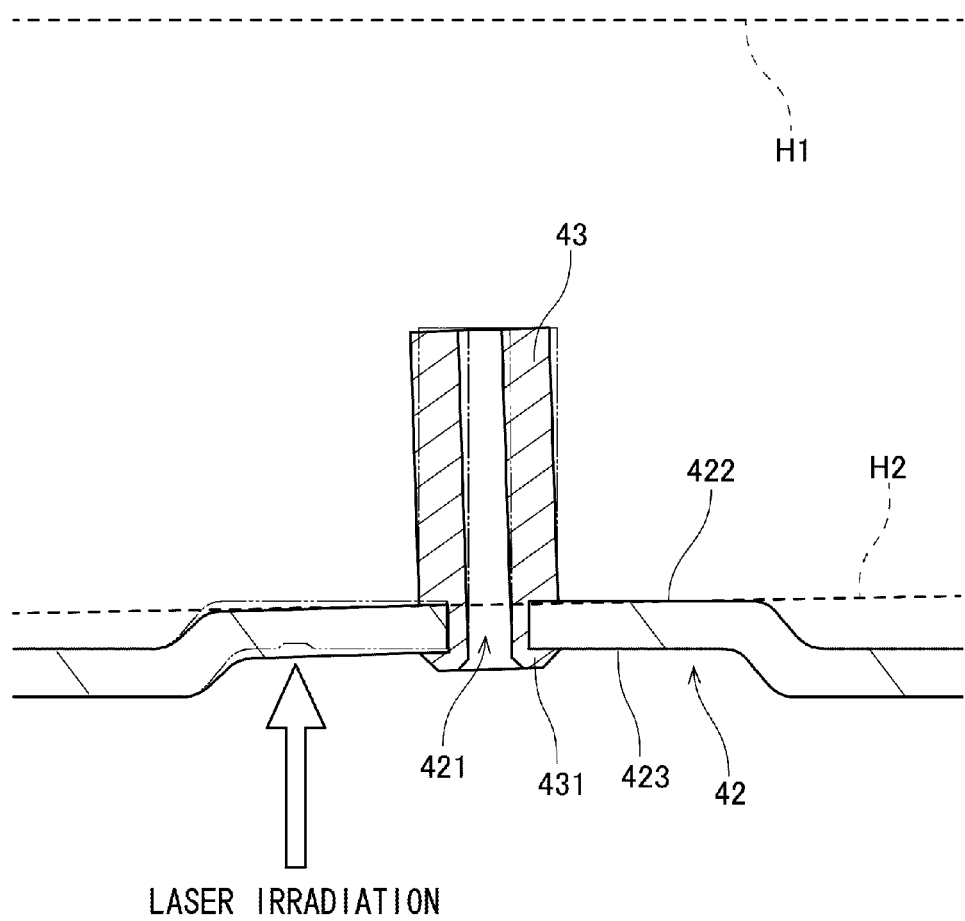
FIG. 7 is a partial cross-sectional view illustrating a portion of the base plate and a support according to a preferred embodiment of the present invention before and after laser beam irradiation.

A method of manufacturing the base unit 10 will now be described below with reference to FIG. 5. FIG. 5 is a flowchart illustrating a procedure of a portion of the process of manufacturing the base unit 10. FIG. 6 is a bottom view of the support fitting portion 42. FIG. 7 is a partial vertical cross-sectional view illustrating a portion of the base plate 12 and the support 43 before and after laser beam irradiation. In FIG. 7, a state before the laser beam irradiation is represented by solid lines, while a state after the laser beam irradiation is represented by chain double-dashed lines.

In the process of manufacturing the base unit 10, the base material of the base plate 12 is first defined (step S101). Specifically, according to the present preferred embodiment, the rolled steel is subjected to press working to define the base material of the base plate 12. Note that the base material of the base plate 12 may alternatively be defined by casting or forging, and may alternatively be made of another metal, such as, for example, aluminum.

Next, the base material of the base plate 12 is subjected to electroless nickel plating (step S102). As a result, a plating layer is defined at a surface of the base plate 12. This contributes to preventing the base plate 12 from gathering rust. The base plate 12 defined by steps S101 and S102 includes the support fitting portion 42 and the hole portion 421 passing through the support fitting portion 42.

Thereafter, the support 43 is fitted to the support fitting portion 42 (step S103). According to the present preferred embodiment, as mentioned above, the support 43 is fitted to the support fitting portion 42 by crimping. Here, a stress applied to the support fitting portion 42 in this crimping step may reduce the parallelism of the support fitting portion 42 with the reference surface 120. A large inclination of the support fitting portion 42 with respect to the reference surface 120 will distort the central axis 91, which is a rotation center of the arms 151. Accordingly, in subsequent steps S104, S105, S106, and S107, the parallelism of the support fitting portion 42 with the reference surface 120 is improved.

Note that the support 43 may alternatively be fitted to the support fitting portion 42 through press fitting or welding. Even in this case, a stress applied to the support fitting portion 42 in a press fitting step or a welding step may reduce the parallelism of the support fitting portion 42 with the reference surface 120.

After step S103, an inclination of the support fitting portion 42 with respect to the reference surface 120 is measured (step S104). More specifically, an inclination of an upper surface 422 of the support fitting portion 42 with respect to the reference surface 120 is measured.

At step S104, first, axial heights of a plurality of reference points P1 in the reference surface 120 of the base plate 12 are measured. Referring to FIG. 2, the reference points P1 are set at, for example, four corners of the reference surface 120 of the base plate 12. Then, a reference plane H1 (see FIG. 7) which substantially coincides with the reference surface 120 is determined by calculation based on the respective heights of the reference points P1. Note that, although the four reference points P1 are set in the present preferred embodiment, three or more than four reference points P1 may be set in other preferred embodiments of the present invention.

Meanwhile, referring to FIG. 2, axial heights of three measuring points P2 in the upper surface 422 of the support fitting portion 42 are measured. Specifically, the height of each of the three measuring points P2 with respect to the reference surface 120 is measured. Then, a measuring plane H2 (see FIG. 7), which represents how the upper surface 422 extends, is determined by calculation based on the respective heights of the measuring points P2. The measuring points P2 according to the present preferred embodiment are set at three points in the upper surface 422, the three points lying on the same circle centered on the central axis 91. This makes it possible to efficiently and accurately determine the measuring plane H2.

Then, based on the determined reference plane H1 and the determined measuring plane H2, a direction (hereinafter referred to as a "downwardly inclining direction") in which the upper surface 422 inclines downward with respect to the reference surface 120 is calculated. In FIG. 6, a "most downwardly inclined line segment" L, which is a line segment extending from the central axis 91 in the downwardly inclining direction, is shown. The most downwardly inclined line segment L is a line segment which is inclined most downwardly with respect to the reference surface 120 of all line segments which join the central axis 91 and an edge portion 425 of a lower surface 423 of the support fitting portion 42.

Next, a laser irradiation area, which is an area to be irradiated with a laser beam, and a laser irradiation output, which is an output of the laser beam, are calculated (step S105). According to the present preferred embodiment, the lower surface 423 is irradiated with the laser beam at step S106, which will be described below. If the lower surface 423 is irradiated with the laser beam, a portion of the support fitting portion 42 adjacent to the lower surface 423 undergoes thermal contraction. As a result, a portion of the support fitting portion 42 adjacent to the laser irradiation area is deformed upward.

Accordingly, the laser irradiation area is arranged to overlap with the most downwardly inclined line segment L. As a result, a portion of the support fitting portion 42 which has a relatively small height with respect to the reference surface 120 is irradiated with the laser beam, so that the parallelism of the support fitting portion 42 with the reference surface 120 is improved.

An area of the laser irradiation area and the laser irradiation output are calculated based on an angle defined by the reference plane H1 with the measuring plane H2, that is, the inclination of the support fitting portion 42. According to the present preferred embodiment, the area of the laser irradiation area is fixed regardless of the inclination of the support fitting portion 42. Meanwhile, the calculated laser irradiation output is arranged to increase as the inclination of the support fitting portion 42 increases.

Note that the area of the laser irradiation area may be varied in accordance with the inclination of the support fitting portion 42 while the laser irradiation output is fixed. In this case, the calculated area of the laser irradiation area is arranged to increase as the inclination of the support fitting portion 42 increases. Also note that both the area of the laser irradiation area and the laser irradiation output may be varied in accordance with the inclination of the support fitting portion 42.

Then, based on the laser irradiation area and the laser irradiation output calculated at step S105, the lower surface 423 of the support fitting portion 42 is irradiated with the laser beam as indicated by a white arrow in FIG. 7 (step S106). As a result, the support fitting portion 42 undergoes thermal contraction, and the portion of the support fitting portion 42 adjacent to the laser irradiation area is deformed upward. Thus, a distortion of the support 43 is corrected as illustrated in FIG. 7. As a result, the distortion of the support 43 in the disk drive apparatus 1 is reduced.

In addition, as illustrated in FIGS. 4, 6, and 7, a melting mark 424 which is depressed upward is defined in the lower surface 423 of the support fitting portion 42 as a result of the laser beam irradiation. The melting mark 424 is defined in the laser irradiation area.

Here, as mentioned above, the base material of the base plate 12 is coated with the plating layer. Once the lower surface 423 of the support fitting portion 42 is irradiated with the laser beam at step S106, a portion of the plating layer melts. At this time, the laser irradiation output is preferably set to a value which does not cause the base material of the base plate 12 to be exposed at the melting mark 424. This contributes to preventing the base plate 12 from gathering rust.

Referring to FIG. 6, the melting mark 424 is arranged in a circular arc with the central axis 91 as a center. That is, the laser irradiation area is an area extending in a circular arc with the central axis 91 as a center. Irradiating an arc-shaped area which is a portion of an area surrounding the support 43 with the laser beam enables the support fitting portion 42 to be efficiently deformed while minimizing a deterioration in flatness of the support fitting portion 42.

A middle portion of the melting mark 424 overlaps with the most downwardly inclined line segment L. That is, the laser irradiation area is arranged in such a manner that a point on the most downwardly inclined line segment L coincides with a middle of the laser irradiation area. The inclination of the support fitting portion 42 can thus be properly corrected. Accordingly, the parallelism of the support fitting portion 42 with the reference surface 120 can be improved. That is, the distortion of the support 43 can be further reduced.

In addition, in the preferred embodiment illustrated in FIG. 6, a central angle of the melting mark 424, with the central axis 91 as an apex thereof, is about 90 degrees. A central angle of the laser irradiation area is preferably arranged to be in the range of 60 degrees to 120 degrees both inclusive. Arranging the central angle of the laser irradiation area to be in the range of 60 degrees to 120 degrees both inclusive contributes to minimizing a deformation of a portion of the support fitting portion 42 which is located above the inclined central axis 91, and efficiently deforming a portion of the support fitting portion 42 which is located below the inclined central axis 91 upward.

The melting mark 424 is arranged radially outside of the outer circumferential surface of the support 43. That is, the laser irradiation area is radially outside of the support 43. If a portion of the support fitting portion 42 which axially overlaps with the support 43 is irradiated with the laser beam, accuracy with which the support 43 is fitted to the support fitting portion 42 may be reduced. Moreover, the portion of the support fitting portion 42 which axially overlaps with the support 43 is not easily deformed even if it is irradiated with the laser beam. Therefore, it is preferable to irradiate an area radially outside of the support 43 with the laser beam as described above.

After step S106, the inclination of the support fitting portion 42 with respect to the reference surface 120 is measured again (step S107). A specific procedure of step S107 is similar to that of step S104. If the inclination of the support fitting portion 42 with respect to the reference surface 120 measured at step S107 does not fall within tolerance, the laser beam irradiation may be performed again, or the base plate 12 and the support 43 may be discarded as articles that are not up to a standard.

In the process of manufacturing the base unit 10, which includes the above-described steps S101 to S107, the fitting of the support 43 to the base plate 12 and the correction of the inclination of the support fitting portion 42 are carried out. The distortion of the support 43 can thus be reduced. That is, a distortion of the central axis 91, which is the rotation center of the access portion 15, can be reduced.

Note that, in the process of manufacturing the base unit 10, the stator 22 and the bearing unit 23 may be fitted to the base plate 12 either between steps S102 and S103 or after step S107.

While a preferred embodiment of the present invention has been described above, it is to be understood that the present invention is not limited to the above-described preferred embodiment.

Although, in the above-described preferred embodiment, the heights of three points in the upper surface of the support fitting portion are measured to calculate the inclination of the support fitting portion with respect to the reference surface, this is not essential to the present invention. Alternatively, heights of three points in the lower surface of the support fitting portion may be measured to calculate the inclination of the support fitting portion with respect to the reference surface based on the measured heights. In this case, it is desirable that each of the three points in the lower surface of the support fitting portion, the heights of which are measured, be not included in the laser irradiation area.

Also note that, although the lower surface of the support fitting portion is irradiated with the laser beam in the above-described preferred embodiment, this is not essential to the present invention. For example, the upper surface of the support fitting portion may be irradiated with the laser beam to correct the inclination of the support fitting portion.

Also note that the detailed shape of any member may be different from the shape thereof as illustrated in the accompanying drawings of the present application. Also note that features of the above-described preferred embodiment and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A disk drive with a spindle motor, comprising:
   a stationary portion including an armature and a base plate to which the armature is fixed;
   a rotating portion including a magnet, and arranged to rotate about a rotation axis with respect to the stationary portion; and
   a head portion that performs at least one of reading and writing of information from or to a disk supported by the rotating portion of the spindle motor; wherein
   the base plate is defined by press working, casting, or forging;
   the base plate includes:
     a flat reference surface;
     a plate-shaped support fitting portion that extends parallel or substantially parallel to the reference surface, the support fitting portion including a recessed lower surface which is recessed axially higher than a lower surface of the base plate which completely circumferentially surrounds the recessed lower surface; and
     a hole portion that passes through the support fitting portion;
   the head portion is positioned to rotate about an axis defined by a substantially columnar support, the substantially columnar support extending along a central axis and fitted to the hole portion by crimping, press fitting, or welding;
   the support fitting portion includes a melting mark defined at at least a portion of the recessed lower surface surrounding the support, the melting mark being depressed axially upward; and
   a central angle of the melting mark is in the range of 60° to 120°, both inclusive.

2. The disk drive with the spindle motor according to claim 1, wherein
   both the armature and the support are arranged above an upper surface of the base plate; and
   the melting mark is defined in a lower surface of the base plate.

3. The disk drive with the spindle motor according to claim 1, wherein
   the support fitting portion is substantially disk-shaped; and
   the melting mark is arranged in a circular arc with the central axis as a center.

4. The disk drive with the spindle motor according to claim 1, wherein the melting mark is arranged radially outside of the support.

5. The disk drive with the spindle motor according to claim 1, wherein
   the base plate is defined by subjecting rolled steel to press working; and
   a surface of the base plate is coated with electroless nickel plating.

6. The disk drive with the spindle motor according to claim 1, wherein
   the base plate is made of aluminum, and is defined by casting or forging; and
   a surface of the base plate is coated with a resin coating.

7. The disk drive with the spindle motor according to claim 1, further comprising:
   a cover; wherein
   the rotating portion and the head portion are accommodated inside a case defined by the base plate and the cover.

* * * * *